United States Patent
Hoshino et al.

(10) Patent No.: US 11,105,070 B2
(45) Date of Patent: Aug. 31, 2021

(54) HYDRAULIC WORK MACHINE

(71) Applicant: HITACHI CONSTRUCTION MACHINERY CO., LTD., Tokyo (JP)

(72) Inventors: Masatoshi Hoshino, Tsuchiura (JP); Kiwamu Takahashi, Moriyama (JP); Seiji Hijikata, Tsukuba (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 365 days.

(21) Appl. No.: 16/330,378

(22) PCT Filed: Mar. 31, 2017

(86) PCT No.: PCT/JP2017/013531
§ 371 (c)(1),
(2) Date: Mar. 5, 2019

(87) PCT Pub. No.: WO2018/179313
PCT Pub. Date: Oct. 4, 2018

(65) Prior Publication Data
US 2020/0190773 A1 Jun. 18, 2020

(51) Int. Cl.
*E02F 9/22* (2006.01)
*F02D 29/04* (2006.01)

(52) U.S. Cl.
CPC .......... *E02F 9/2296* (2013.01); *E02F 9/2246* (2013.01); *B60W 2710/0644* (2013.01);
(Continued)

(58) Field of Classification Search
CPC .......... B60W 2710/0644; E02F 9/2246; E02F 9/2235; E02F 9/2296; E02F 9/2285;
(Continued)

(56) References Cited

U.S. PATENT DOCUMENTS 8,695,566 B2 4/2014 Kawaguchi et al.
2008/0254939 A1* 10/2008 Ichimura ................. F02D 29/04
477/107

(Continued)

FOREIGN PATENT DOCUMENTS

EP 2 982 804 A1 2/2016
JP 05-312082 A 11/1993
(Continued)

OTHER PUBLICATIONS

Extended European Search Report received in corresponding European Application No. 17904018.3 dated Mar. 10, 2020.
(Continued)

*Primary Examiner* — Peter D Nolan
*Assistant Examiner* — Demetra R Smith-Stewart
(74) *Attorney, Agent, or Firm* — Mattingly & Malur, PC

(57) ABSTRACT

To increase frequency of use of auto idle, an engine is accelerated even more quickly than before and work involving a heavy load can be performed within a short period of time when an operator resumes work and recovers a speed of the engine. When an operation lever device is operated and the speed is low because of auto idle control, a pilot pump is unloaded to thereby reduce load torque on the engine. Operation of a compressor is also suspended while an air conditioner is operating. Furthermore, for a target speed of the engine, a speed at which work can be performed is set and the engine is accelerated. When the engine thereafter reaches a predetermined speed or a predetermined period of time thereafter elapses, the pilot pump is loaded and the operation of the compressor for the air conditioner is resumed.

6 Claims, 5 Drawing Sheets

(52) U.S. Cl.
CPC ........... *E02F 9/2235* (2013.01); *E02F 9/2285* (2013.01); *F02D 29/04* (2013.01); *F15B 2211/20553* (2013.01); *F15B 2211/6309* (2013.01); *F15B 2211/6316* (2013.01)

(58) Field of Classification Search
CPC ............ F02D 29/04; F15B 2211/20553; F15B 2211/6309; F15B 2211/6316
See application file for complete search history.

(56) References Cited

U.S. PATENT DOCUMENTS

| | | | |
|---|---|---|---|
| 2010/0170227 A1* | 7/2010 | Tsukada | F02D 41/0245 60/286 |
| 2013/0312616 A1* | 11/2013 | Shibamori | E02F 9/2282 96/419 |
| 2016/0290369 A1* | 10/2016 | Opdenbosch | F02D 29/04 |
| 2017/0130428 A1* | 5/2017 | Matsuzaki | E02F 9/20 |

FOREIGN PATENT DOCUMENTS

| | | |
|---|---|---|
| JP | 2010-169204 A | 8/2010 |
| JP | 2012-140877 A | 7/2012 |
| JP | 2014-031747 A | 2/2014 |
| JP | 2014-169675 A | 9/2014 |
| WO | 2015/064577 A1 | 5/2015 |

OTHER PUBLICATIONS

International Preliminary Report on Patentability received in corresponding International Application No. PCT/JP2017/013531 dated Oct. 10, 2019.
International Search Report of PCT/JP2017/013531 dated May 23, 2017.

* cited by examiner

HYDRAULIC WORK MACHINE

TECHNICAL FIELD

The present invention relates generally to hydraulic work machines such as hydraulic excavators and, more particularly, to a hydraulic work machine having a function that varies a speed of an engine such that the speed of the engine reduces when work is interrupted and that the speed of the engine automatically increases when the work is resumed.

BACKGROUND ART

Operations of a hydraulic work machine such as a hydraulic excavator typically include excavation, swing, and travel that are connected with each other by a wait time interposed therebetween. Many machines hitherto developed are provided with a function that, in order to reduce noise, and improve fuel consumption and exhaust emissions, determines a period of time during which an operator does not operate an operation lever (operation device) to be a wait time and automatically reduces the speed of the engine, and when the operator thereafter operates the operation lever to resume work, automatically increases the speed of the engine to a level appropriate for performance of the work. The function is what is called auto idle or auto deceleration (hereinafter referred to as the auto idle) and is enabled when the operator opts to use the function. To enjoy improved noise reduction, fuel consumption, and exhaust emissions, importantly, the engine speed is recovered quickly and the work can be resumed smoothly without the operator having an awkward feeling during returning from the auto idle.

To achieve the foregoing, Patent Document 1 discloses a technique that, when the engine is being accelerated for returning from the auto idle, shortens an acceleration time, specifically, time required for resumption of work by setting a minimum value for torque of a hydraulic pump that assumes load on the engine.

Patent Document 2, which represents an improvement on the technique disclosed in Patent Document 1, discloses a technique that sets an appropriate value for the torque of the hydraulic pump in accordance with engine torque performance and boost pressure such that a predetermined type of work can be performed even while the engine is being accelerated.

PRIOR ART DOCUMENT

Patent Documents

Patent Document 1: JP-1993-312082-A
Patent Document 2: JP-2014-169675-A

SUMMARY OF THE INVENTION

Problems to be Solved by the Invention

Requirements for the auto idle function reside in the engine speed during the wait time being as low as possible from the viewpoint of noise reduction and fuel consumption and in capability of performance of work involving a heavy load within a period of time as short as possible once the operator resumes work. It is thus important that the engine be accelerated quickly from a low speed to a speed at which a sufficient torque can be developed.

From the foregoing viewpoint, a need exists for acceleration of the engine even more quickly than in the technique disclosed in Patent Document 1 to thereby enable performance of work involving a heavy load within a short period of time when the operator resumes the work.

The technique disclosed in Patent Document 2 derives torque from the pump even while the engine is being accelerated. This increases the acceleration time compared with the technique disclosed in Patent Document 1 and limits the type of work to be performed at that time to one involving a light load. Thus, depending on the operator or the type of work, or depending on the length and frequency of the wait time, the operator may opt not to use the auto idle and spend the wait time with the engine running at high speeds. This increases noise inside and outside the hydraulic work machine and aggravates fuel consumption.

An object of the present invention is to provide a hydraulic work machine that, in order to increase frequency at which auto idle is used, enables an engine to be accelerated even more quickly than ever and a type of work involving a heavy load to be performed within a short period of time when the operator resumes work and recovers a speed of the engine.

Means for Solving the Problems

To achieve the foregoing object, an aspect of the present invention provides a hydraulic work machine that includes: an engine; a hydraulic pump and a pilot pump driven by the engine; a plurality of actuators driven by hydraulic fluid delivered from the hydraulic pump, the actuators driving respective work elements; a plurality of flow control valves that control flow of hydraulic fluid supplied from the hydraulic pump to the respective actuators; a plurality of operation devices that generate operation pilot pressures commanding operations of the work elements using delivery fluid from the pilot pump to thereby change positions of the flow control valves; a gate lock lever that is operated selectively into a first position at which an entrance to an operator's seat is restricted and generation of the operation pilot pressures by the operation devices is enabled and a second position at which the entrance to the operator's seat is open and the generation of the operation pilot pressures by the operation devices is disabled; a plurality of engine loads driven by the engine, the engine loads excluding the hydraulic pump; an engine speed setting device that sets a target speed of the engine; and an engine control system that controls a speed of the engine such that the speed of the engine corresponds with the target speed set by the engine speed setting device and that performs auto idle control, the auto idle control reducing the speed of the engine to an auto idle speed set in advance when a condition in which the operation devices are not operated exists continuously for a predetermined period of time or when the gate lock lever is placed in the second position, and bringing the speed of the engine from the auto idle speed to a speed corresponding with the target speed set by the engine speed setting device when any of the operation devices is operated and work is resumed. In the hydraulic work machine, the engine control system performs engine speed early recovery control that, when any of the operation devices is operated and work is resumed in the auto idle control and when the speed of the engine is brought from the auto idle speed back to the speed corresponding with the target speed set by the engine speed setting device, unloads at least one of the engine loads other than the hydraulic pump and, after the speed of the engine increases to a predetermined speed, loads the engine load again.

When any of the operation devices is operated and work is resumed and when the speed of the engine is brought back to the speed corresponding with the target speed set by the engine speed setting device, the at least one of the engine loads other than the hydraulic pump is unloaded to thereby reduce the engine loads. The engine can thereby be accelerated even more quickly than before and work involving a heavy load can be performed within a short period of time. Additionally, because operability of the auto idle control is improved, frequency of use of the auto idle control can be increased.

Advantages of the Invention

In accordance with the present invention, when the operator resumes work and recovers the engine speed, the engine can be accelerated even more quickly than before and work involving a heavy load can be performed within a short period of time. Additionally, because of the improved operability of the auto idle control, the auto idle control is used more frequently, so that effects can be achieved of reduced noise inside and outside the hydraulic work machine and of improved fuel economy.

MODES FOR CARRYING OUT THE INVENTION

Figure 1:
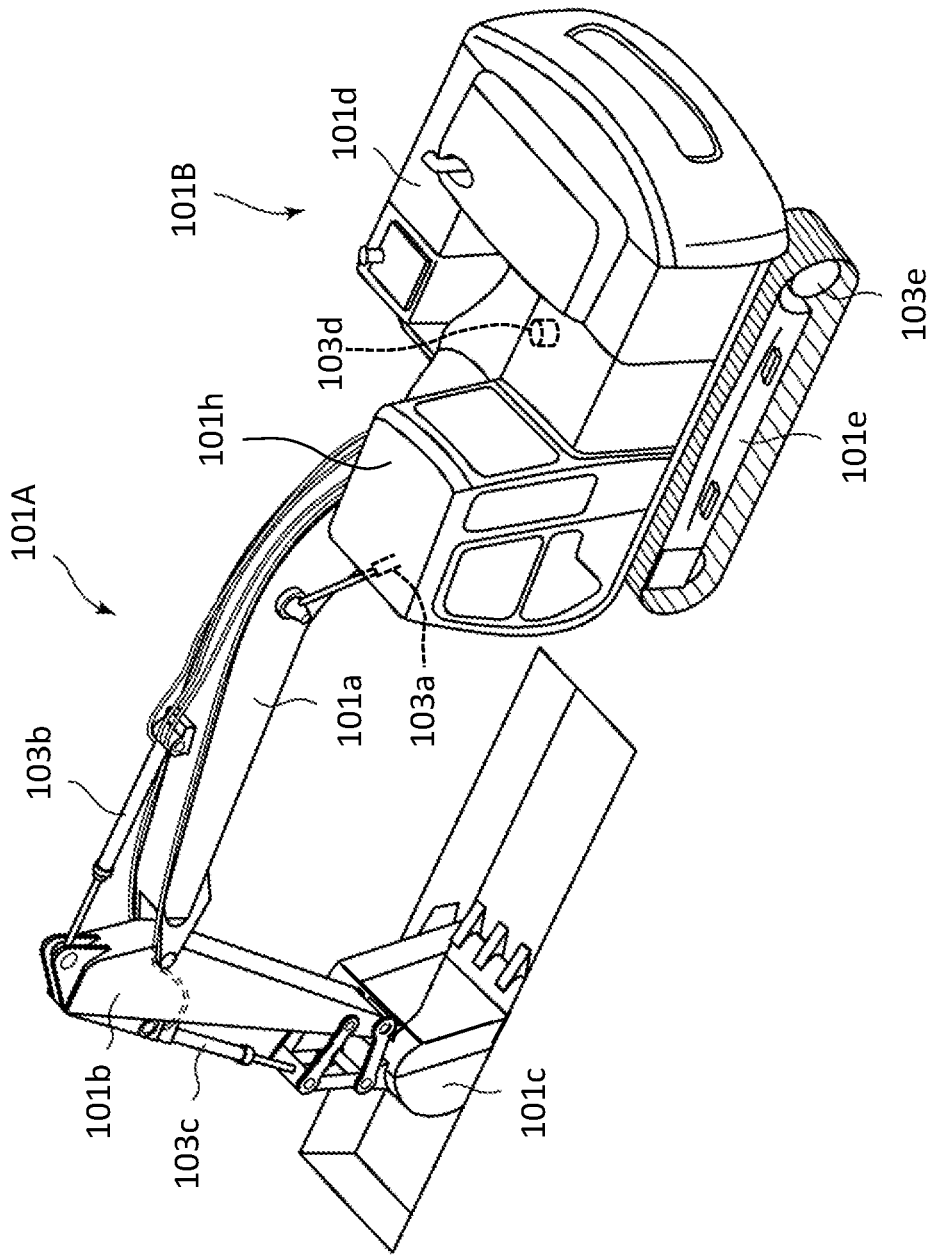
FIG. 1 is an illustration of an appearance of a hydraulic excavator according to an embodiment of the present invention.

A hydraulic excavator that exemplifies a hydraulic work machine according to an embodiment of the present invention will be described below with reference to the accompanying drawings.
Structure FIG. 1 is an illustration of an appearance of the hydraulic excavator.

The hydraulic excavator includes a multi-articulated front implement 101A and a machine body 101B. The front implement 101A includes a boom 101a, an arm 101b, and a bucket 101c. The boom 101a, the arm 101b, and the bucket 101c each rotate in a vertical direction. The machine body 101B includes an upper swing structure 101d and a lower track structure 101e. The boom 101a of the front implement 101A has a proximal end supported rotatably in the vertical direction at a front portion of the upper swing structure 101d. The boom 101a, the arm 101b, the bucket 101c, the upper swing structure 101d, and the lower track structure 101e are driven by a boom cylinder 103a, an arm cylinder 103b, a bucket cylinder 103c, a swing motor 103d, and left and right track motors 103e and 103f, respectively. Operation of the boom 101a, the arm 101b, the bucket 101c, and the upper swing structure 101d is directed by an operation pilot pressure that serves as a hydraulic operation signal of each of operation lever devices 4a and 4b (see FIG. 2). Operation of the lower track structure 101e is directed by an operation pilot pressure that serves as a hydraulic operation signal of an operation pedal device for traveling not depicted.

The upper swing structure 101d includes a cabin 101h. A cab, in which an operator's seat 101s is disposed, is defined inside the cabin 101h. A plurality of operation devices including the operation lever devices 4a and 4b (see FIG. 2) and the operation pedal device for traveling, and a gate lock lever 34 (see FIG. 2), for example, are disposed at the operator's seat 101s.

Figure 2:
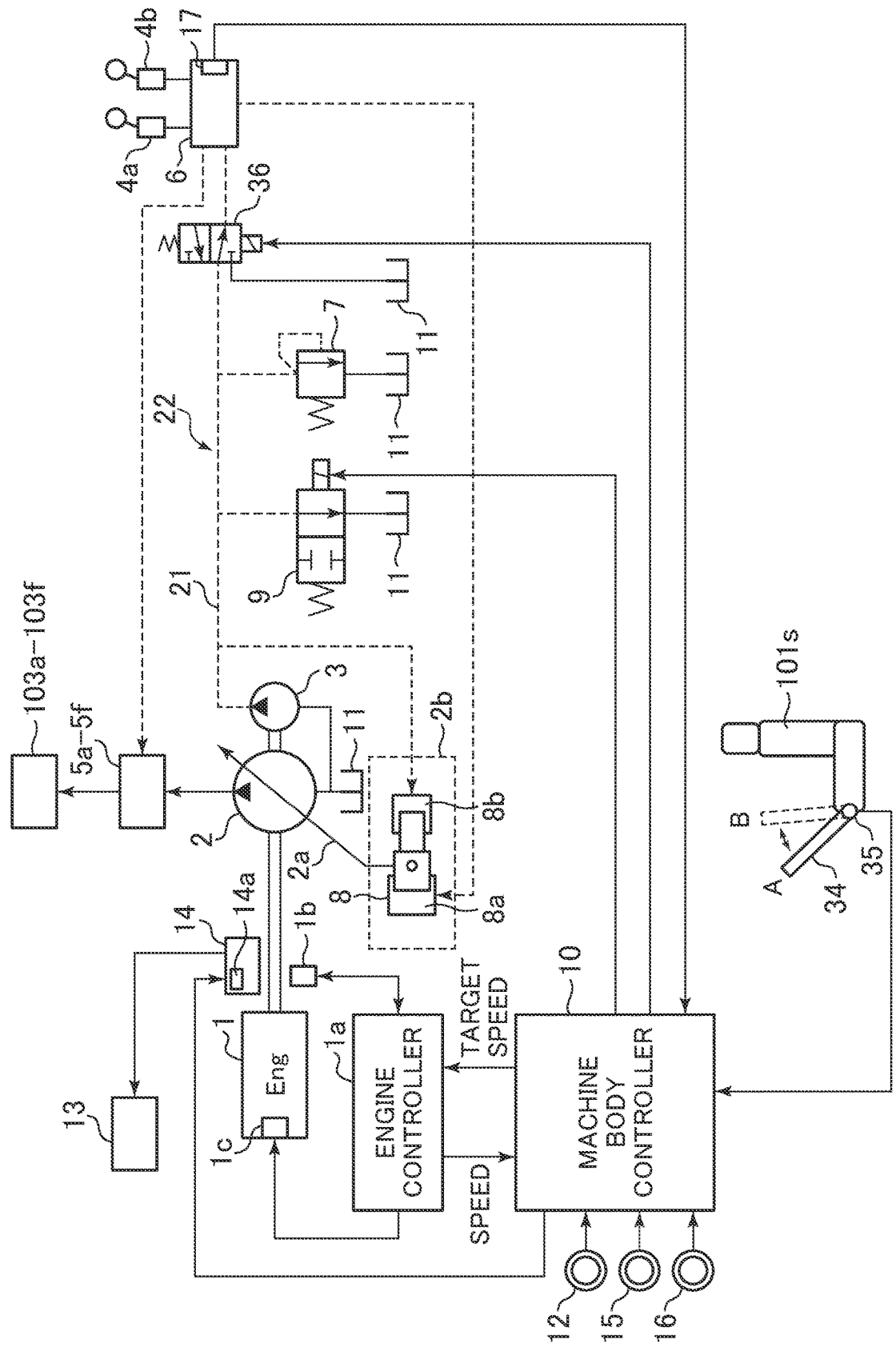
FIG. 2 is a system configuration diagram of a hydraulic drive system, an engine controller, and peripheral devices mounted in the hydraulic excavator.

FIG. 2 is a system configuration diagram of a hydraulic drive system, an engine controller, and peripheral devices mounted in the hydraulic excavator.

In FIG. 2, the hydraulic drive system includes an engine 1 (diesel engine), a main hydraulic pump 2, a pilot pump 3, a plurality of actuators 103a to 103f, a plurality of flow control valves 5a to 5f, and a plurality of operation devices. The hydraulic pump 2 and the pilot pump 3 each have a rotational shaft coupled with a rotational shaft of the engine 1 and are each driven by the engine 1. The actuators 103a to 103f are driven by hydraulic fluid delivered from the hydraulic pump 2 and drive the respective work elements 101a to 101e. The flow control valves 5a to 5f control flow of the hydraulic fluid (directions and flow rates of the hydraulic fluid) supplied from the hydraulic pump 2 to the respective actuators 103a to 103f. The operation devices including the operation lever devices 4a and 4b generate operation pilot pressures that direct operations (direction and speed) of the work elements 101a to 101e on the basis of delivery fluid of the pilot pump 3 to thereby change positions of the flow control valves 5a to 5f.

The work elements 101a to 101e represent the boom, the arm, the bucket, the upper swing structure, and the lower track structure, respectively, depicted in FIG. 1. The actuators 103a to 103f represent the boom cylinder, the arm cylinder, the bucket cylinder, the swing motor, and the left and right track motors, respectively, depicted in FIG. 1. FIG. 2 omits depicting the operation devices other than the operation lever devices 4a and 4b.

A pilot relief valve 7 is connected with a hydraulic line 21 through which the delivery fluid of the pilot pump 3 is guided to the operation lever devices 4a and 4b. The pilot relief valve 7 forms a pilot pressure circuit 22, which generates a predetermined primary pilot pressure. The operation lever devices 4a and 4b each incorporate a pair of pilot valves (pressure reducing valves). Each reduces the primary pilot pressure of the pilot pressure circuit 22 as a source pressure so as to correspond to an operation amount of an operation lever of the operation lever device 4a or 4b (operation amount of the operation device) and thereby generates the operation pilot pressure that corresponds to the operation direction and the operation amount of the operation lever. The foregoing holds for other operation devices not depicted in FIG. 2. The operation pilot pressures generated by the operation lever devices 4a and 4b and the operation devices not depicted in FIG. 2 are guided to the flow control valves 5a to 5f via a signal control valve 6 and drive respective spools of the flow control valves 5a to 5f. The direction in which, and the speed at which, the hydraulic actuators 103a to 103f are operated, are thereby varied.

The hydraulic pump 2 is a variable displacement type including a displacement varying member (e.g., swash plate) 2a and a regulator 2b. The displacement varying member 2a varies displacement of the hydraulic pump 2. The regulator 2b drives the displacement varying member 2a to thereby vary capacity of the hydraulic pump. The regulator 2*b* includes a regulator piston 8. The regulator piston 8 includes a large-diameter pressure receiving portion 8*a* and a small-diameter pressure receiving portion 8*b*.

The signal control valve 6 incorporates a plurality of shuttle valves. The signal control valve 6 outputs the operation pilot pressures generated by the operation lever devices 4*a* and 4*b* and other operation devices to the flow control valves 5*a* to 5*f*. The signal control valve 6 also has a function of selecting the highest operation pilot pressure among the generated operation pilot pressures to thereby generate and output a control pressure. The control pressure output from the signal control valve 6 is guided to the large-diameter pressure receiving portion 8*a* of the regulator piston 8. The primary pilot pressure in the hydraulic line 21 generated by the pilot pressure circuit 22 is guided to the small-diameter pressure receiving portion 8*b* of the regulator piston 8.

When all of the operation levers or operation pedals (hereinafter referred to representatively as the "operation levers") of the operation lever devices 4*a* and 4*b* and other operation devices are in a neutral position, the operation pilot pressures generated by the operation lever devices 4*a* and 4*b* and other operation devices assume a tank pressure and the control pressure output from the signal control valve 6 also assumes the tank pressure. At this time, a piston main body of the regulator piston 8 is pushed to the left in FIG. 2 by the primary pilot pressure of the pilot pressure circuit 22, the displacement varying member 2*a* is placed at a minimum tilting position, and the hydraulic pump 2 has a minimum delivery flow rate. When any of the operation levers of the operation lever devices 4*a* and 4*b* and other operation devices is operated, an operation pilot pressure corresponding to an operation amount of the operation lever is generated and the operation pilot pressure is output from the signal control valve 6 to the large-diameter pressure receiving portion 8*a* of the regulator piston 8 as the control pressure. At this time, the piston main body of the regulator piston 8 is pushed to the right in FIG. 2 so as to correspond to a difference in pressure receiving area between the large-diameter pressure receiving portion 8*a* and the small-diameter pressure receiving portion 8*b* and a magnitude of the control pressure. Thus, a tilting angle of the displacement varying member 2*a* increases and the delivery flow rate of the hydraulic pump 2 also increases. As such, the regulator piston 8 is driven in response to the operation amount of the operation lever of any of the operation lever devices 4*a* and 4*b* and other operation devices, and controls the delivery flow rate of the hydraulic pump 2 so as to achieve a flow rate corresponding to the operation amount of the operation lever (positive control).

The signal control valve 6 also includes a pressure sensor 17. The pressure sensor 17 detects the control pressure generated by the signal control valve 6. A detection signal of the pressure sensor 17 is applied to a machine body controller 10. The control pressure generated by the signal control valve 6 represents a pressure obtained by reducing the primary pilot pressure in response to any of the operation levers of the operation lever devices 4*a* and 4*b* and other operation devices. This enables the machine body controller 10 to detect the operation amount of the operation lever using the detection signal of the pressure sensor 17.

An unloading solenoid valve 9 is connected with the hydraulic line 21 of the pilot pressure circuit 22. The unloading solenoid valve 9 is operated by an electric signal from the machine body controller 10. The unloading solenoid valve 9 may be placed in an open position (unloading position), in which communication is established between the hydraulic line 21 and a tank 11, or a closed position (loading position), in which communication is interrupted between the hydraulic line 21 and the tank 11. When the electric signal from the machine body controller 10 is OFF, the unloading solenoid valve 9 is in the closed position, in which the pilot pump 3 is loaded (under a loaded condition in which a predetermined primary pilot pressure is being generated in the pilot pressure circuit 22). When the electric signal from the machine body controller 10 turns ON, the unloading solenoid valve 9 is placed in the open position, in which the hydraulic fluid in the hydraulic line 21 is guided to the tank 11 to thereby unload the pilot pump 3 (under an unloaded condition in which the predetermined primary pilot pressure is not being generated in the pilot pressure circuit 22).

The unloading solenoid valve 9 may be a hydraulic pressure switching type. In this case, an electrohydraulic conversion valve is disposed between the machine body controller 10 and the unloading valve, and the unloading valve may be placed in the appropriate position by a pressure output from the electrohydraulic conversion valve.

A gate lock lever 34 is disposed on the left in front of the operator's seat (on the ingress side of the cabin 101*h*). The gate lock lever 34 can be operated selectively into a first position A and a second position B. The first position A represents a lowered position at which an entrance to the operator's seat 101*s* is restricted. The second position B represents a raised position at which the entrance to the operator's seat 101*s* is open. A position sensor 35 is disposed at a proximal end of the gate lock lever 34. The position sensor 35 detects the position in which the gate lock lever 34 is placed. A detection signal of the position sensor 35 is applied to the machine body controller 10. A solenoid-operated changeover valve 36 is disposed downstream along the hydraulic line 21 of the pilot pressure circuit 22. The solenoid-operated changeover valve 36 is controlled to be energized or de-energized according to an open or closed position of the gate lock lever 34. When the gate lock lever 34 is placed in the first position A, the machine body controller 10 outputs an ON signal to thereby energize a solenoid in the solenoid-operated changeover valve 36, bringing the solenoid-operated changeover valve 36 in the position depicted in FIG. 2. At this time, the pressure in the pilot pressure circuit 22 is guided to the operation lever devices 4*a* and 4*b* and other operation devices via the signal control valve 6, so that the operation lever devices 4*a* and 4*b* and other operation devices can generate the operation pilot pressure. As a result, the flow control valves 5*a* to 5*f* can be operated by the operation pilot pressure. When the gate lock lever 34 is raised and placed in the second position B, the machine body controller 10 outputs an OFF signal to thereby de-energize the solenoid in the solenoid-operated changeover valve 36, bringing the solenoid-operated changeover valve 36 in a position as changed from the position depicted in FIG. 2. Communication between the pilot pressure circuit 22 and the operation lever devices 4*a* and 4*b* and other operation devices is thereby interrupted. This disables generation of the operation pilot pressure by the operation lever devices 4*a* and 4*b* and other operation devices, and disables operations of the flow control valves 5*a* to 5*f* by the operation pilot pressure. Specifically, raising and placing the gate lock lever 34 in the second position B locks the operation lever devices 4*a* and 4*b* and other operation devices.

The engine 1 is controlled by an engine controller 1*a* so as to rotate at a predetermined speed. A speed sensor 1*b* is mounted on the engine 1. A detection signal of the speed sensor 1*b* is applied to the engine controller 1*a*. Additionally, the engine controller 1*a* inputs a target speed from the machine body controller 10. On the basis of a speed of the engine 1 calculated from the detection signal of the speed sensor 1*b* and the target speed input from the machine body controller 10, the engine controller 1*a* calculates a target value of a fuel injection amount that causes the speed of the engine 1 to correspond with the target speed, and outputs a control signal to a fuel injection device 1*c* which is provided for the engine 1. The fuel injection device 1*c* uses the control signal to inject an amount of fuel corresponding with the target value calculated by the engine controller 1*a*. An engine control dial 12 is disposed near the operator's seat 101*s* of the hydraulic excavator. The engine control dial 12 is an engine speed setting device that sets the target speed of the engine 1. An operation signal of the engine control dial 12 is applied to the machine body controller 10. The target speed of the engine 1 can be adjusted by the operator operating the engine control dial 12.

An auto idle switch 16 is disposed near the operator's seat 101*s*. A signal from the auto idle switch 16 is also applied to the machine body controller 10. When the operator selects an auto idle mode using the auto idle switch 16 and when a predetermined period of time elapses after the operation lever of the operation lever devices 4*a* and 4*b* and other operation devices has been placed in the neutral position, the machine body controller 10 outputs an auto idle speed set in advance as the target speed to the engine controller 1*a* instead of a target speed set by the engine control dial 12, even when a high target speed corresponding to a heavy load has been set by the engine control dial 12. It is here noted that the auto idle speed is a speed at which noise is low during the wait time and that permits quick recovery when work is resumed. Thus, the speed of the engine 1 is automatically reduced after the lapse of the predetermined period of time after the operator has interrupted the work, so that noise is reduced and fuel economy is improved. When the operator resumes the work, the machine body controller 10 uses the detection signal of the pressure sensor 17 to detect that any of the operation levers of the operation lever devices 4*a* and 4*b* and other operation devices moves from the neutral position. The machine body controller 10 switches the target speed to be applied to the engine controller 1*a* from the auto idle speed to the speed set by the engine control dial 12, so that work can be performed at the target speed specified by the operator.

The above description says that the speed of the engine 1 is automatically reduced to the auto idle speed when the predetermined period of time elapses after any of the operation levers of the operation lever devices 4*a* and 4*b* and other operation devices has been placed in the neutral position. The speed of the engine 1 may be automatically reduced to the auto idle speed alternatively when the gate lock lever 34 is placed from the first position A (at which generation of the operation pilot pressures of the operation lever devices 4*a* and 4*b* and other operation devices is enabled) in the second position B (at which generation of the operation pilot pressures of the operation lever devices 4*a* and 4*b* and other operation devices is disabled). In this case, too, the speed of the engine 1 is automatically reduced when the operator places the gate lock lever 34 in the second position B in order to interrupt the work, so that noise is reduced and fuel economy is improved. To resume the work, the operator places the gate lock lever 34 back in the first position A and operates any of the operation levers of the operation lever devices 4*a* and 4*b* and other operation devices. Then, the target speed of the engine 1 is switched to the speed set by the engine control dial 12 as described above and the work can be performed at the target speed specified by the operator.

An air conditioner 13 is disposed in the cab, in which the operator's seat 101*s* is disposed, inside the cabin 101*h*. The engine 1 rotatably drives a compressor 14 and a refrigerant thereby compressed is supplied to the air conditioner 13, which includes a condenser and an evaporator. The operator operates an air conditioner operation dial 15 in the cab to thereby regulate a temperature inside the cab. A signal from the air conditioner operation dial 15 is applied to the machine body controller 10. The machine body controller 10, while displaying a set temperature and an air flow rate, for example, on a display not depicted, controls to engage and disengage an electromagnetic clutch 14*a*, which is incorporated in the compressor 14, such that the set temperature is reached in the cab. When the electromagnetic clutch 14*a* is engaged, the engine 1 rotates a rotational portion of the compressor 14, so that the refrigerant is compressed. This increases the load on the engine 1. When the electromagnetic clutch 14*a* is disengaged, the compressor 14 does not compress the refrigerant, so that the load on the engine 1 by the compressor 14 decreases substantially to zero.

The electromagnetic clutch 14*a* may be a hydraulic pressure switching type, in which case, an electrohydraulic conversion valve is disposed between the machine body controller 10 and the clutch and the clutch may be engaged or disengaged by a pressure output from the electrohydraulic conversion valve.

Figure 3:
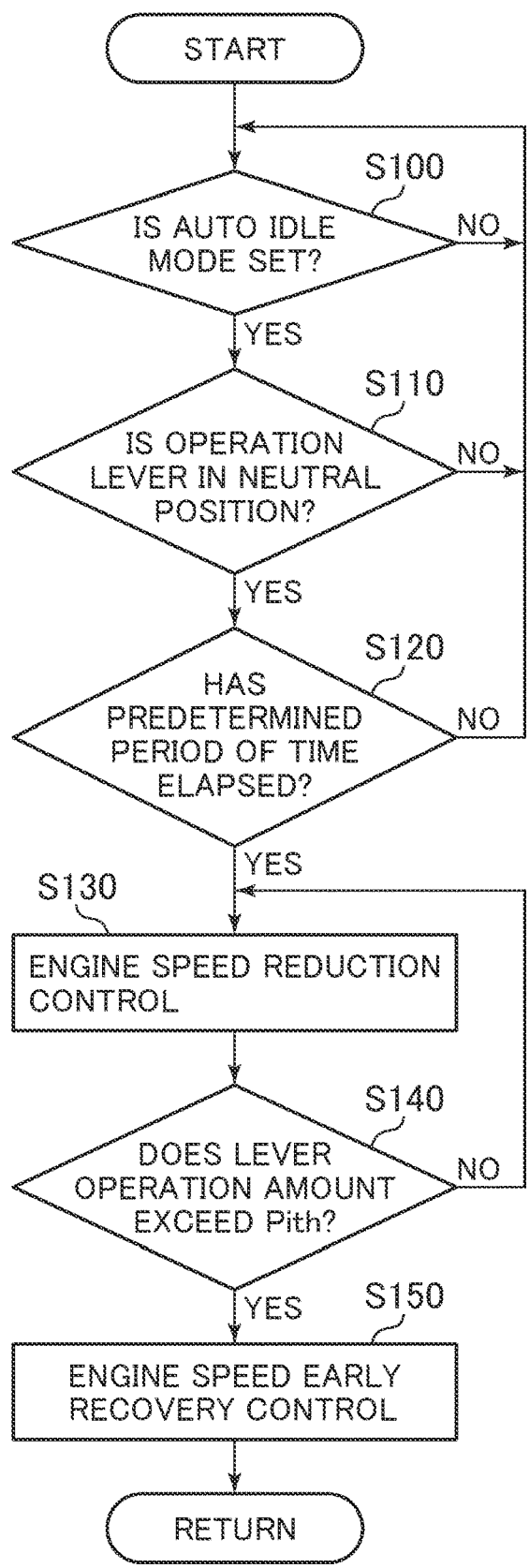
FIG. 3 is a flowchart of processing functions of auto idle control in a machine body controller.

FIG. 3 is a flowchart of functions of auto idle control in the machine body controller 10. The functions of the auto idle control of the machine body controller 10 depicted in FIG. 3 and the engine controller 1*a* constitute an engine control system that performs the auto idle control of the present invention.

The machine body controller 10 determines, on the basis of the operation signal of the auto idle switch 16, whether the auto idle mode has been selected (Step S100). If it is determined that the auto idle mode has not been selected, the machine body controller 10 repeats this determination step.

If it is determined at Step S100 that the auto idle mode has been selected, the machine body controller 10 determines, on the basis of the detection signal of the pressure sensor 17, whether any of the operation levers of the operation lever devices 4*a* and 4*b* and other operation devices has been operated (Step S110). More specifically, the machine body controller 10 calculates the operation pilot pressure using the detection signal of the pressure sensor 17. When the operation pilot pressure exceeds a dead zone, the machine body controller 10 determines that the operation lever has been operated. When the operation pilot pressure is otherwise, the machine body controller 10 determines that the operation levers have not been operated (are in the neutral position). If it is determined that the operation lever is being operated (is not in the neutral position), the machine body controller 10 repeats this determination step.

If it is determined at Step S110 that the operation levers have not been operated (are in the neutral position), the machine body controller 10 then determines whether a predetermined period of time has elapsed after the operation levers were placed in the neutral position (Step S120). If it is determined that the predetermined period of time has yet to elapse after the operation levers were placed in the neutral position, the machine body controller 10 repeats this determination step.

When repeating the determination step at each of Steps S100, S110, and S120, the machine body controller 10 outputs the target speed set by the engine control dial 12 to the engine controller 1a. The engine 1 is controlled to achieve a speed on the basis of the target speed set by the engine control dial 12.

If it is determined at Step S120 that the predetermined period of time has elapsed after the operation levers were placed in the neutral position, the machine body controller 10 outputs as the target speed to the engine controller 1a an auto idle speed set in advance instead of the target speed set by the engine control dial 12, even when a high target speed corresponding to a heavy load has been set by the engine control dial 12 (Step S130). This causes the speed of the engine 1 to automatically reduce to the auto idle speed when the predetermined period of time has elapsed after the operation levers were placed in the neutral position.

The machine body controller 10 next determines on the basis of the detection signal of the pressure sensor 17 whether any of the operation levers of the operation lever devices 4a and 4b and other operation devices has been operated and the operation pilot pressure exceeds a threshold Pith (Step S140). If it is determined at this time that the operation pilot pressure obtained from the detection signal of the pressure sensor 17 does not exceed the threshold Pith, the machine body controller 10 repeats this determination step. If it is determined that the operation pilot pressure exceeds the threshold Pith, the machine body controller 10 performs engine speed early recovery control characteristic of the present invention (Step S150).

Figure 4:
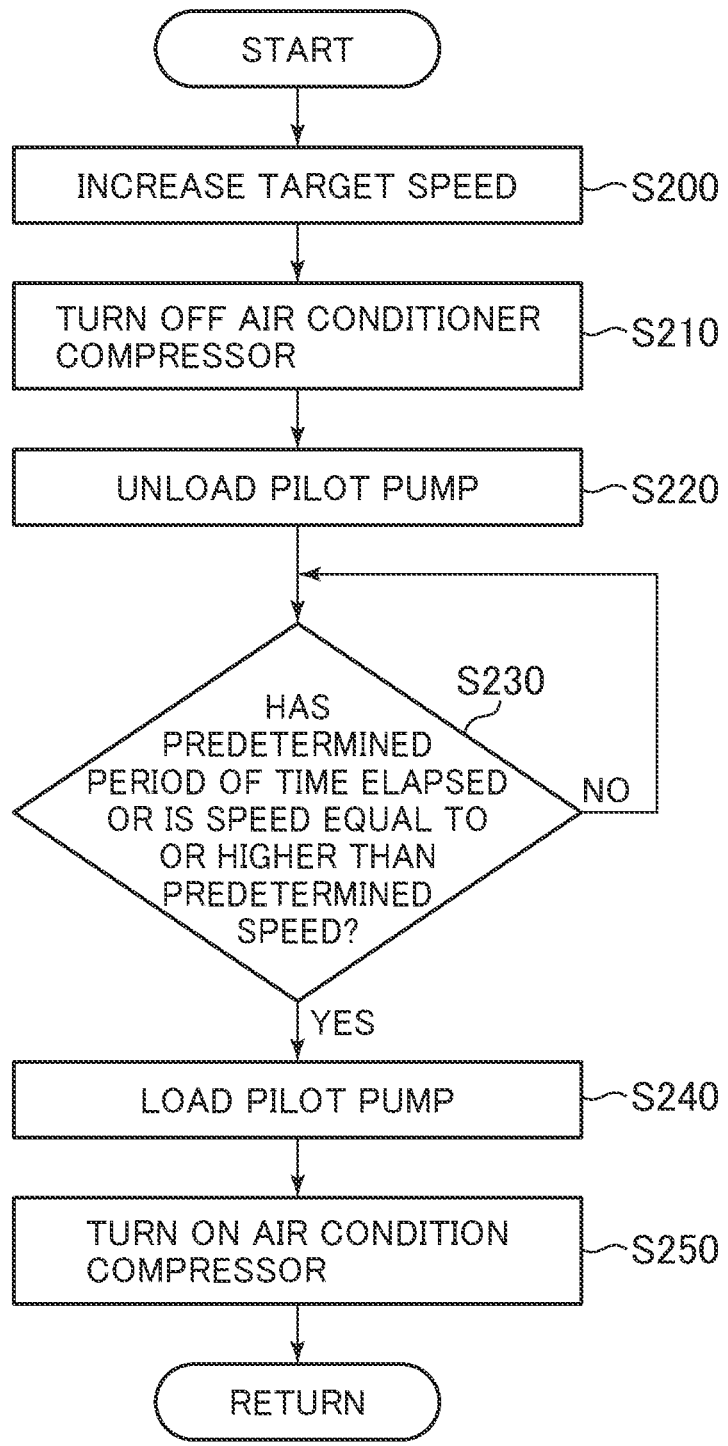
FIG. 4 is a flowchart of processing details of engine speed early recovery control as part of the auto idle control.

FIG. 4 is a flowchart of processing details of the engine speed early recovery control.

If it is determined at Step S140 in FIG. 3 that the operation pilot pressure exceeds the threshold Pith, the machine body controller 10 switches the target speed of the engine 1 from the idle speed to the target speed set by the engine control dial 12 (Step S200) to thereby accelerate the engine 1.

At the same time, the machine body controller 10 turns OFF the control signal to be output to the compressor 14 of the air conditioner 13 thereby to disengage the electromagnetic clutch 14a of the compressor 14 and to turn OFF the compressor 14 (Step S210). Additionally, the machine body controller 10 turns ON the control signal to be output to the unloading solenoid valve 9 to thereby place the unloading solenoid valve 9 in the unloading position, thus unloading the pilot pump 3 (Step S220). This reduces the load on the engine 1, so that the speed of the engine 1 can be quickly recovered to a speed corresponding to the target speed set by the engine control dial 12. It is here noted that the processing of Steps S200, S210, and S220 are each performed, as triggered by the operation pilot pressure exceeding the threshold Pith. Thus, the processing of Steps S200, S210, and S220 may be performed in any order.

The machine body controller 10 next determines whether an actual speed of the engine 1 input from the engine controller 1a has increased to a predetermined value, for example, a speed of 90% of the target speed set by the engine control dial 12 and whether a predetermined period of time has elapsed after the speed was switched to the target speed set by the engine control dial 12 (Step S230). If it is determined that neither of the foregoing is affirmed, the machine body controller 10 repeats the determination step. If it is determined that either one of the foregoing is affirmed (either the actual speed has increased to the predetermined speed or the predetermined period of time has elapsed after the target speed was switched), the machine body controller 10 turns OFF the control signal to be output to the unloading solenoid valve 9 to thereby bring the unloading solenoid valve 9 back in the loading position, thus loading the pilot pump 3 again (Step S240). At the same time, the machine body controller 10 turns ON the control signal to be output to the compressor 14 of the air conditioner 13 to thereby engage the electromagnetic clutch 14a of the compressor 14 (Step S250).

It is noted that the threshold Pith represents an operation amount of the operation lever of the operation lever device (operation amount of the operation device) within a range through which the actuators 103a to 103f do not start moving after the operation lever of any of the operation lever devices 4a and 4b and other operation devices has been operated. For example, the threshold Pith represents an operation pilot pressure that corresponds with an upper limit value of the range. This value is set in advance as the threshold Pith in the machine body controller 10.

Operation

Figure 5:
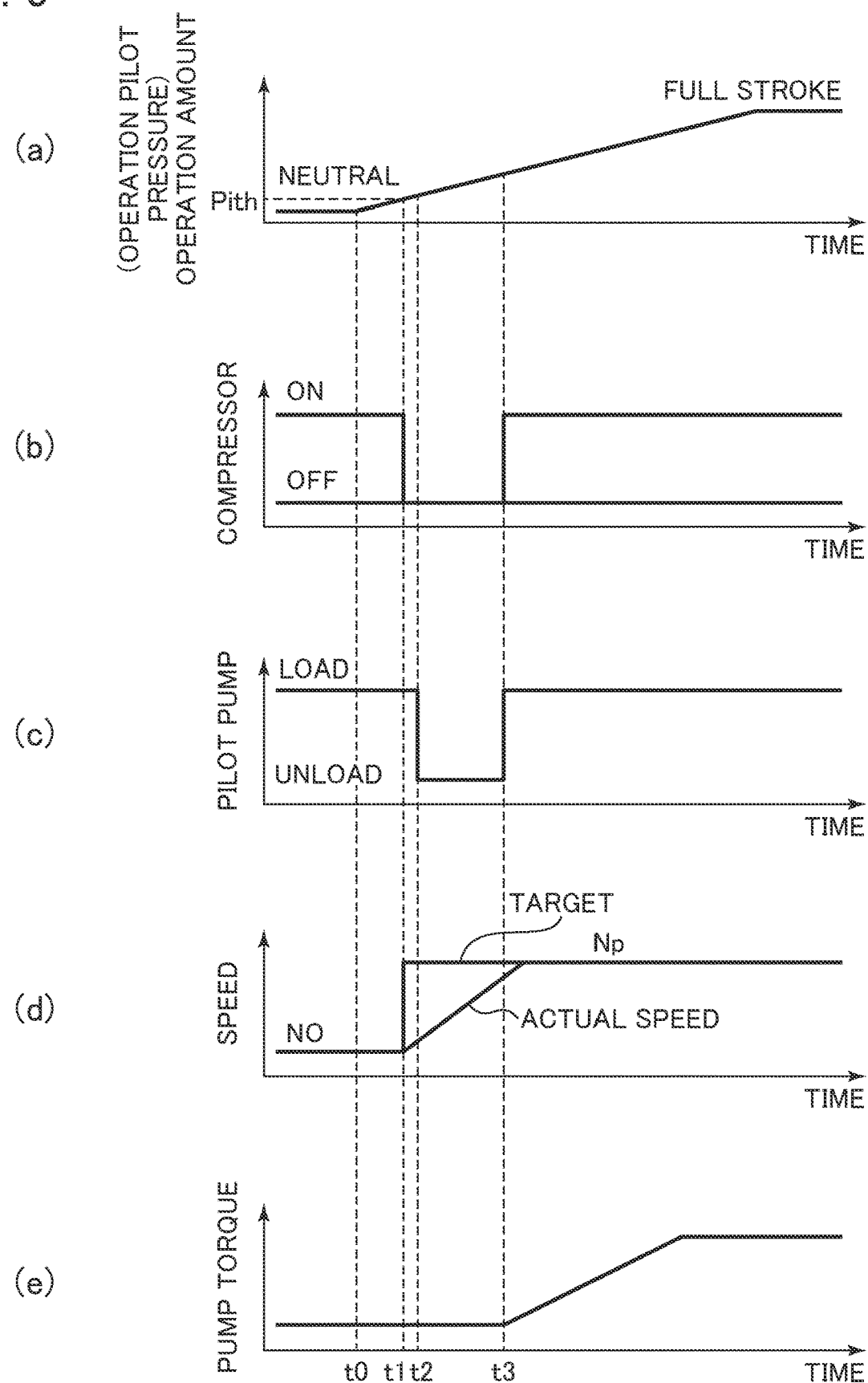
FIG. 5 is a timing chart depicting changes in behavior over time of different parts by the engine speed early recovery control.

FIG. 5 is a timing chart depicting changes in behavior over time of different parts by the engine speed early recovery control. The changes in the behavior over time of different parts by the engine speed early recovery control will be described using these timing charts.

A part (a) of FIG. 5 relates to the operation amount of the operation lever. The timing chart of FIG. 5(a) depicts a situation in which, from a condition in which the operator selects the auto idle mode, work is interrupted, and the speed of the engine 1 is reduced, the operation lever is moved from the neutral position to a full stroke position at time t0 in order to resume the work, which causes the operation pilot pressure (the control pressure generated by the signal control valve 6) increases accordingly. The following describes operations of the compressor 14 of the air conditioner 13, the pilot pump 3, the engine 1, and the hydraulic pump 2 during returning from the auto idle state to resume the work.

A part (b) of FIG. 5 depicts states of the electromagnetic clutch 14a of the compressor 14, whether the electromagnetic clutch 14a is engaged or disengaged. When the operation amount depicted in the prat (a) is varied from the neutral position and the operation pilot pressure increases to exceed the threshold Pith at time t1, the machine body controller 10 disengages the electromagnetic clutch 14a of the compressor 14 to thereby reduce the load on the engine 1. For a period before time t1, the electromagnetic clutch 14a is repeatedly engaged and disengaged depending on a difference between a set temperature of the air conditioner 13 and a temperature inside the cab. For a period from time t1 to time 3 to be described later, the electromagnetic clutch 14a is disengaged regardless of the temperature.

A part (c) of FIG. 5 depicts changes in the delivery pressure of the pilot pump. At time t1, the machine body controller 10 places the unloading solenoid valve 9 in the unloading position to thereby unload the pilot pump 3. At this time, the delivery pressure (primary pilot pressure) of the pilot pump 3 decreases, involving a slight lag including response of the unloading solenoid valve 9, and is substantially zero at time t2. Following time t2, no work can be performed even by moving the operation lever. Because the load on the engine 1 is, however, reduced, the speed of the engine 1 increases within an even shorter time. The pilot pump 3 is again loaded at time t3 to be described later and work can then be performed.

If the actuator already started moving at time t1, unloading the pilot pump 3 brings the actuator, which has started moving, to a stop. This aggravates operability. In the present embodiment, the threshold Pith is set, as described above, to the operation amount of the operation lever of the operation lever device (operation amount of the operation device) within the range through which the actuators 103a to 103f do not start moving after the operation lever of any of the operation lever devices 4a and 4b and other operation devices has been operated. For example, the threshold Pith is set to the operation pilot pressure that corresponds with the upper limit value of the range. Then, at time t1 at which the operation pilot pressure reaches the threshold Pith, the unloading solenoid valve 9 is placed in the unloading position and the pilot pump 3 is unloaded. The foregoing arrangement prevents the actuator, once started moving, from being brought to a stop by the unloading of the pilot pump 3. Early recovery control of the engine speed can thus be achieved without operability being aggravated.

A part (d) of FIG. 5 depicts speeds of the engine 1. At time t1, the target speed is switched from a speed NO of auto idle to a speed Np set by the operator using the engine control dial 12. The actual speed of the engine 1 slightly lags in following the target speed, but reaches the target speed Np under a steady state. Assume that the actual speed reaches 90% of the target speed at time t3. Then, acceleration of the engine 1 is substantially completed at time t3 to return from the auto idle. At time t3, the electromagnetic clutch 14a of the compressor 14 is engaged again and the air conditioner 13 restores normal control. The pilot pump 3 is loaded again at time t3. Because the speed of the engine 1 is already close to the speed Np set by the operator, the work that was interrupted to reduce the speed through auto idle can be resumed without the operator having an awkward feeling.

As described previously, the machine body controller 10 also determines whether a predetermined period of time elapses after the switching to the target speed Np set by the engine control dial 12. This arrangement allows the pilot pump 3 to be loaded again after the lapse of the predetermined period of time even when the engine 1 fails to increase the speed due to failure or trouble of the engine 1 and the actual speed fails to reach 90% of the target speed. The hydraulic excavator can thus be moved to ensure safety.

A part (e) of FIG. 5 depicts torque absorbed by the hydraulic pump 2 as a result of the above control. Because the operation lever is in the neutral position for a period up to time t1 and the pilot pump 3 is unloaded for a period between time t1 and time t3, the torque absorbed by the hydraulic pump 2 remains the lowest. The pilot pump 3 is loaded at time t3, so that the torque absorbed by the hydraulic pump 2 thereafter increases with increasing operation amounts of the operation lever.

Advantages

As described above, in accordance with the present embodiment, when the operation lever devices 4a and 4b are operated in the auto idle control to resume work and, to increase the speed of the engine 1 from the auto idle speed to a speed corresponding with the target speed set by the engine control dial 12 (engine speed setting device), the unloading solenoid valve 9 is placed in the unloading position and the electromagnetic clutch 14a of the compressor 14 is disengaged to thereby reduce the load on the engine 1. The engine 1 can thereby be accelerated more quickly than before and work involving a heavy load can be performed within a short period of time.

Because the present embodiment also improves operability of the auto idle control, frequency of use of the auto idle control increases, so that noise inside and outside the hydraulic excavator as a hydraulic work machine can be reduced and fuel economy can be improved.

Additionally, in accordance with the present embodiment, the threshold Pith is set to the operation pilot pressure that corresponds with the upper limit value of the range through which the actuators 103a to 103f do not start moving after the operation lever of any of the operation lever devices 4a and 4b and other operation devices has been operated and, at time t1 at which the operation pilot pressure reaches the threshold Pith, the unloading solenoid valve 9 is placed in the unloading position to thereby unload the pilot pump 3. The unloading of the pilot pump 3 prevents a situation in which the actuator, once started moving, is brought to a stop from occurring. This enables early recovery control of the engine speed without allowing operability to be aggravated.

Additionally, in accordance with the present embodiment, to recover the speed of the engine 1 through the engine speed early recovery control, the unloading solenoid valve 9 is placed back in the loading position even when the speed of the engine 1 is yet to reach the predetermined speed, when a predetermined period of time elapses after the target speed of the engine 1 is switched to the target speed set by the engine control dial 12. This arrangement allows the pilot pump 3 to be loaded after the lapse of the predetermined period of time even when the engine 1 fails to increase the speed due to failure or trouble of the engine 1 and the actual speed fails to reach 90% of the target speed. The hydraulic excavator can thus be moved to ensure safety.

Miscellaneous

In the present embodiment described above, when the work is resumed and the engine speed early recovery control is to be performed, the engine load is reduced by performing two types of control, one unloading the pilot pump 3 by changing the position of the unloading solenoid valve 9 in the pilot pressure circuit and the other disconnecting the compressor 14 from the engine by disengaging the electromagnetic clutch 14a of the compressor 14. Nonetheless, only one of the foregoing two types of control may be performed (for example, changing the position of the unloading solenoid valve 9 in the pilot pressure circuit to thereby unload the pilot pump 3). In this case, too, the engine 1 can be accelerated more quickly than before and work involving a heavy load can be performed within a short period of time.

DESCRIPTION OF REFERENCE CHARACTERS

1: Engine
1a: Engine controller (engine control system)
1b: Speed sensor
1c: Fuel injection device
2: Hydraulic pump
2a: Displacement varying member
2b: Regulator
3: Pilot pump
4a, 4b: Operation lever device
5a to 5f: Flow control valve
6: Signal control valve
7: Pilot relief valve
8: Regulator piston
9: Unloading solenoid valve
10: Machine body controller (engine control system)
11: Tank
12: Engine control dial (engine speed setting device)
13: Air conditioner
14: Compressor
14a: Electromagnetic clutch
15: Air conditioner operation dial
16: Auto idle switch
17: Pressure sensor
21: Hydraulic line 22: Pilot pressure circuit
34: Gate lock lever
103a to 103: Actuator

The invention claimed is:

1. A hydraulic work machine, comprising:
an engine;
a hydraulic pump and a pilot pump driven by the engine;
a plurality of actuators driven by hydraulic fluid delivered from the hydraulic pump, the actuators driving respective work elements;
a plurality of flow control valves that control flow of the hydraulic fluid supplied from the hydraulic pump to the respective actuators;
a plurality of operation devices that generate operation pilot pressures commanding operations of the work elements using delivery fluid from the pilot pump to thereby change positions of the flow control valves;
a gate lock lever that is operated selectively into a first position at which an entrance to an operator's seat is restricted and generation of the operation pilot pressures by the operation devices is enabled and a second position at which the entrance to the operator's seat is open and the generation of the operation pilot pressures by the operation devices is disabled;
a plurality of engine loads driven by the engine, the engine loads excluding the hydraulic pump;
an engine speed setting device that sets a target speed of the engine; and
an engine control system that controls a speed of the engine such that the speed of the engine corresponds with the target speed set by the engine speed setting device and that performs auto idle control, the auto idle control reducing the speed of the engine to an auto idle speed set in advance when a condition in which the operation devices are not operated exists continuously for a predetermined period of time or when the gate lock lever is placed in the second position, and bringing the speed of the engine from the auto idle speed to a speed corresponding with the target speed set by the engine speed setting device when any of the operation devices is operated and work is resumed, wherein
the engine control system performs engine speed early recovery control that, when any of the operation devices is operated and work is resumed in the auto idle control and when the speed of the engine is brought from the auto idle speed back to the speed corresponding with the target speed set by the engine speed setting device, unloads at least one of the engine loads other than the hydraulic pump and, after the speed of the engine increases to a predetermined speed, loads the engine load again.

2. The hydraulic work machine according to claim 1, wherein
the engine control system sets in advance, as a threshold, operation amounts of the operation devices within a range through which the actuators do not start moving after the operation devices have been operated, detects the operation amounts of the operation devices when recovering the speed of the engine through the engine speed early recovery control, and unloads the at least one of the engine loads other than the hydraulic pump upon the operation amounts of the operation devices reaching the threshold after the operation devices have been operated.

3. The hydraulic work machine according to claim 1, further comprising:
a pilot pressure circuit including a hydraulic line through which the delivery fluid from the pilot pump is guided to the operation devices and an unloading valve connected with the hydraulic line, the unloading valve being placed in an unloading position to connect the hydraulic line with a tank to thereby unload the pilot pump and the unloading valve being placed in a loading position to disconnect the hydraulic line from the tank to thereby load the pilot pump, wherein,
the at least one of the engine loads other than the hydraulic pump is the pilot pump driven by the engine, and
in the engine speed early recovery control, the engine control system places the unloading valve in the unloading position to thereby unload the engine load as the pilot pump and places the unloading valve in the loading position to thereby load again the engine load as the pilot pump.

4. The hydraulic work machine according to claim 1, further comprising:
an air conditioner disposed in a cab; and
a compressor for the air conditioner, the compressor driven by the engine and including an electromagnetic clutch, the electromagnetic clutch disengaged disconnecting the compressor from the engine and the electromagnetic clutch engaged connecting the compressor with the engine, wherein
the at least one of the engine loads other than the hydraulic pump is the compressor for the air conditioner, and
in the engine speed early recovery control, the engine control system disengages the electromagnetic clutch of the compressor to thereby unload the engine load as the compressor and engages the electromagnetic clutch of the compressor to thereby load again the engine load as the compressor.

5. The hydraulic work machine according to claim 3, further comprising:
an air conditioner disposed in a cab; and
a compressor for the air conditioner, the compressor driven by the engine and including an electromagnetic clutch, the electromagnetic clutch disengaged disconnecting the compressor from the engine and the electromagnetic clutch engaged connecting the compressor with the engine, wherein
the engine loads other than the hydraulic pump further include the compressor for the air conditioner, and
in the engine speed early recovery control, the engine control system disengages the electromagnetic clutch of the compressor to thereby unload the engine load as the compressor in addition to the unloading of the engine load as the pilot pump and engages the electromagnetic clutch of the compressor to thereby load again the engine load as the compressor.

6. The hydraulic work machine according to claim 2, wherein,
when recovering the speed of the engine through the engine speed early recovery control, the engine control system loads again the engine load even when the speed of the engine fails to reach the predetermined speed, when a predetermined period of time elapses after the target speed of the engine is switched to the target speed set by the engine speed setting device.

* * * * *